Sept. 26, 1944.  C. L. EKSERGIAN  2,359,094
BRAKE MECHANISM
Filed Nov. 21, 1942
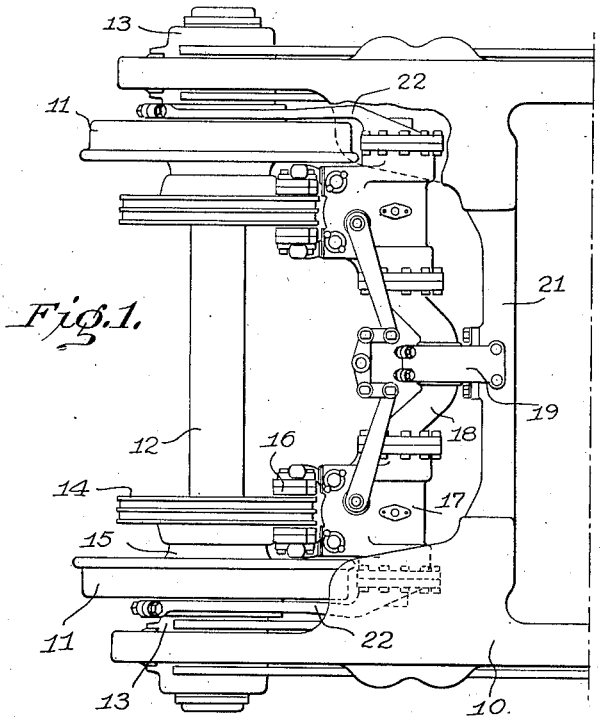
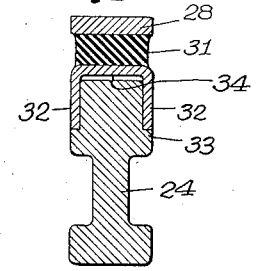
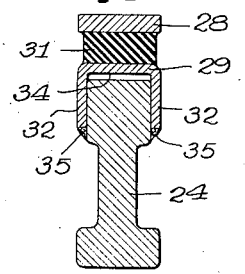
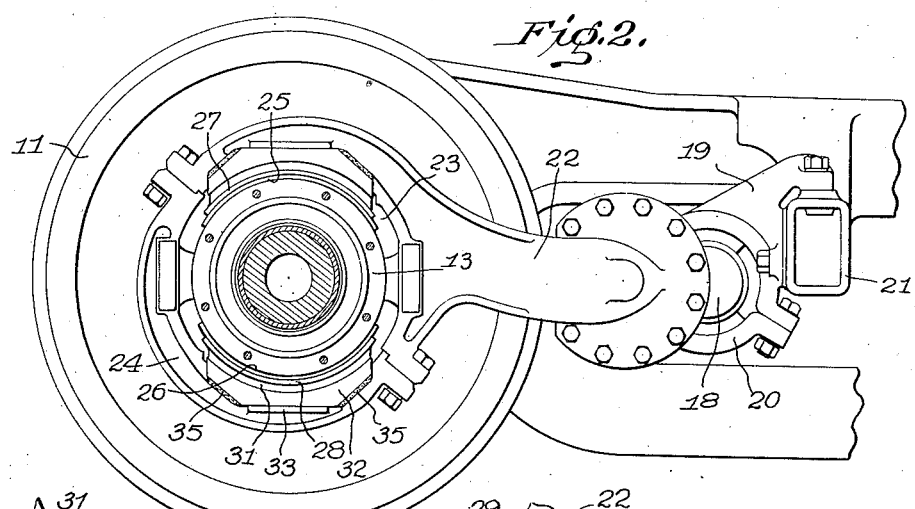
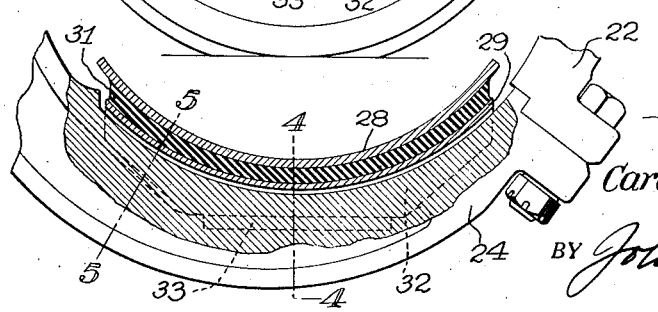
INVENTOR
Carolus L. Eksergian
BY John P. Tarbox
ATTORNEY Patented Sept. 26, 1944

2,359,094

UNITED STATES PATENT OFFICE 2,359,094

BRAKE MECHANISM

Carolus L. Eksergian, Detroit, Mich., assignor to Budd Wheel Company, Philadelphia, Pa., a corporation of Pennsylvania Application November 21, 1942, Serial No. 466,393

4 Claims. (Cl. 188—205)

This invention relates to brake mechanisms of the type in which a brake supporting yoke or C-frame is supported in part on an associated journal box and in which cooperating bearing faces or wear plates are provided on both the journal box and the yoke. More particularly the present invention is an improvement on the structure described in my earlier Patent 2,284,484 of May 26, 1942.

An object of this invention is to provide a brake mechanism of the type specified having an improved means for supporting the yoke or C-frame on the associated journal box.

A further object is to provide a brake mechanism in which the yoke or C-frame has an improved means for securing a bearing plate thereto, constructed and arranged to insure the quick and easy application of the bearing plate and its supporting structure on the yoke in properly centered position, while eliminating any need for difficult machining operations.

These and other objects which will be apparent to those skilled in the art are accomplished by the present invention, one embodiment of which is illustrated in the accompanying drawing in which:

Fig. 1 is a plan view of a portion of a wheel truck showing one type of brake mechanism to which the present invention is adapted, Fig. 2 is a side elevation, partly in section, of the C-frame shown in Fig. 1, showing the present invention from the elevation, Fig. 3 is a partial sectional view, on an enlarged scale, showing certain details of the invention, and Figs. 4 and 5 are transverse sectional views on the lines 4—4 and 5—5, respectively, of Fig. 3.

The particular embodiment of the invention which has been chosen for illustration is shown in connection with a railway car truck 10 having wheels 11 on an axle 12 supported at each end in journal boxes 13 mounted in the truck frame 10. Brake discs 14 are connected to wheel hubs 15 for rotation therewith and brake mechanisms including brake shoes 16, fluid pressure, brake-actuating cylinders 17 and associated mechanism are supported on a supporting yoke or C-frame 18, in the usual manner. The yoke or C-frame is supported at its center by a bracket 19 to which it is secured by a strap 20, the bracket 19 being, in turn, securely bolted to a frame member such as the transom 21.

At each end the yoke is provided with an arm 22 secured thereto and extending forwardly in position to be supported upon the associated journal box. The end of each arm is shaped to form a semi-circular opening 23 embracing the upper portion of the associated journal box 13 and a strap 24 bolted to the open end of the arm cooperates therewith in embracing the lower half of the journal box which has curved, upper and lower bearing plates 25 and 26, respectively. The upper plate 25 engages a curved bearing plate 27 suitably mounted on the arm 22, while the lower plate 26 engages a curved bearing plate 28 similarly mounted on the strap 24.

The bearing plates 25, 26, 27, and 28 are each formed of material which is self-hardening under wear such, for example, as the high carbon manganese steel known as Hadfield steel containing 1 to 1.35% carbon and 11 to 14% manganese. Such material is self-hardening under wear and provides wear plates capable of long and severe use.

The wear plates 27 and 28 are resiliently mounted upon the supporting arm 22 and strap 24, respectively, by a supporting means of such construction as to insure accurate locating of the plates on the arm and strap. Inasmuch as the means for supporting the plates on both the arm and the strap are identical, a description of the latter will suffice for both.

A U-shaped backing plate 29 is connected to the bearing face or wear plate 28 by a block 31 of rubber, or some similar material, which is vulcanized to both the wear plate and the backing plate. The arms of the U-shaped backing plate embrace the edge of the strap 24 and engage the sides thereof. The arms 32 are of such length that their edges engage shoulders 33 formed on the strap 24 while the bottom inner face 34 of the U-shaped backing plate is spaced somewhat from the adjacent edge of the strap 24, see Figs. 4 and 5, so that it is not necessary to machine the face 34 to provide for accurately locating the bearing plate on the strap.

In assembling the parts it is only necessary to slip the U-shaped backing plate into position over the edge of the strap, with the edges of the plate thereof abutting the shoulders 33 on the strap, in order to properly locate the parts in their proper relative positions. Thereafter the edges of the U-shaped backing plate at each side of the shoulder 33 are welded in place as indicated at 35 in Fig. 2.

In operation, it will be apparent that the device provides a resilient cushion which largely absorbs the vibration and shocks transmitted from the wheels, such action producing compressive stresses in the rubber blocks 31. Application of the brakes causes the C-frame to oscillate about the axle 12, producing an oscillation or shearing stress in the rubber blocks 31 until the resistance of the rubber overcomes the frictional resistance between the wear plates 25, 26 and the wear plates 27, 28, respectively, the remaining component of oscillation producing a sliding movement between the respective plates.

It will be apparent that the present invention can be variously modified and adapted within the scope of the pending claims.

What is claimed is:

1. A wheel truck having in combination, a journal box, a brake supporting shouldered yoke disposed above and below said journal box, wear plates on said box and yoke, means for mounting one of said plates on said yoke including a backing plate having the edges thereof formed to engage the shoulders on said yoke, means securing said plate to said yoke with the edges thereof in engagement with said shoulders, and means resiliently supporting said wear plate on said backing plate for engagement with the wear plate on said journal box.

2. A wheel truck having in combination, a journal box, a brake supporting shouldered yoke disposed above and below said journal box, wear plates on said box and yoke, means for mounting one of said plates on said yoke including a U-shaped backing plate embracing the edge of said yoke with the edges thereof engaging the shoulders on said yoke, means for securing said backing plate to said yoke, and means resiliently supporting said wear plate on said backing plate for engagement with the wear plate on said journal box.

3. A wheel truck having in combination, a journal box, a brake member supported on said journal box, a bearing plate, a U-shaped backing plate embracing the edge of said member, plate positioning faces on said member for engaging a portion of each edge of said U-shaped backing plate to maintain a space between the edge of said brake member and the bottom of said U-shaped backing plate, means securing said U-shaped backing plate to said member, and means for supporting said bearing plate on said U-shaped backing plate.

4. A wheel truck having in combination, a journal box, a brake member supported on said journal box, a bearing plate, a U-shaped backing plate embracing the edge of said member, plate positioning faces on said member for engaging a portion of each edge of said U-shaped backing plate to maintain a space between the edge of said brake member and the bottom of said U-shaped backing plate, welds securing the remaining portions of the edges of said U-shaped backing plate to said brake member, and means for supporting said bearing plate on said U-shaped backing plate.

CAROLUS L. EKSERGIAN.